(12) United States Patent
Langston

(10) Patent No.: US 8,322,640 B2
(45) Date of Patent: Dec. 4, 2012

(54) APPARATUS, SYSTEM, AND METHOD FOR COMPOSTABLE WASTE PROCESSING

(76) Inventor: Jody Langston, Kingston, WA (US)

(*) Notice: Subject to any disclaimer, the term of this patent is extended or adjusted under 35 U.S.C. 154(b) by 217 days.

(21) Appl. No.: 12/939,052

(22) Filed: Nov. 3, 2010

(65) Prior Publication Data

US 2011/0101137 A1 May 5, 2011

Related U.S. Application Data

(60) Provisional application No. 61/257,610, filed on Nov. 3, 2009.

(51) Int. Cl.
*B02C 21/00* (2006.01)
*B02C 23/00* (2006.01)

(52) U.S. Cl. .................. 241/29; 241/100; 241/152.2

(58) Field of Classification Search .......... 241/29, 241/152.2, 100, 272, 185.5–194
See application file for complete search history.

(56) References Cited

U.S. PATENT DOCUMENTS

| | | | |
|---|---|---|---|
| 4,102,263 A | 7/1978 | Forsberg | |
| 4,537,361 A | 8/1985 | Heimerich | |
| 4,620,479 A | 11/1986 | Diamond et al. | |
| 4,996,918 A | 3/1991 | Carter et al. | |
| 5,119,722 A | 6/1992 | Carter et al. | |
| 5,123,341 A | 6/1992 | Carter et al. | |
| 5,129,318 A | 7/1992 | Zimmer | |
| 5,172,630 A | 12/1992 | Thompson | |
| 5,221,052 A | 6/1993 | Vega | |
| 5,240,656 A | 8/1993 | Scheeres | |
| 5,251,832 A | 10/1993 | Hentschel | |
| 5,257,577 A | 11/1993 | Clark | |
| 5,259,304 A | 11/1993 | Roberts | |
| 5,263,841 A | 11/1993 | de Soet | |
| 5,297,481 A | 3/1994 | Robbins et al. | |
| 5,355,789 A | 10/1994 | Suzuki et al. | |
| 5,415,086 A | 5/1995 | Robbins | |
| 5,433,390 A | 7/1995 | Keeler et al. | |
| 5,447,017 A | 9/1995 | Becher et al. | |
| 5,460,085 A | 10/1995 | Cappellari et al. | |
| 5,484,109 A * | 1/1996 | Cook | 241/73 |
| 5,489,200 A | 2/1996 | McGraw et al. | |
| 5,513,804 A | 5/1996 | Keeler et al. | |
| 5,664,493 A | 9/1997 | Kim | |
| 5,666,878 A | 9/1997 | Taricco | |

(Continued)

FOREIGN PATENT DOCUMENTS

DE 9210518 10/1992

(Continued)

OTHER PUBLICATIONS

European Search Report, dated Feb. 26, 2009.

(Continued)

*Primary Examiner* — Faye Francis
(74) *Attorney, Agent, or Firm* — Kunzler Law Group, PC

(57) ABSTRACT

An apparatus, system, and method to process compostable waste. The apparatus includes a shredding module, a grinding module, and a bagging module. The shredding module may operate to shred non-food compostable waste into shredded waste. The grinding module may operate to combine the shredded waste with food waste into combined waste, add water to the combined waste if an insufficient moisture condition exists for further processing, and grind the combined waste into particulate waste. The bagging module may operate to bag the particulate waste into a compostable bag.

20 Claims, 9 Drawing Sheets

U.S. PATENT DOCUMENTS

| | | | |
|---|---|---|---|
| 5,740,725 A | | 4/1998 | Tomizawa et al. |
| 5,772,134 A | * | 6/1998 | Bouldin et al. ............. 241/79.1 |
| 5,813,323 A | | 9/1998 | Nowak |
| 5,814,790 A | | 9/1998 | Bondeson et al. |
| 5,832,818 A | | 11/1998 | Menzak, Jr. |
| 6,141,945 A | | 11/2000 | Becher |
| 7,562,836 B2 | | 7/2009 | Langston |
| 7,571,870 B2 | | 8/2009 | Langston |
| 2004/0129810 A1 | | 7/2004 | Kasprowicz et al. |
| 2009/0039184 A1 | | 2/2009 | Vanderpool |
| 2009/0041639 A1 | | 2/2009 | Vanderpool |

FOREIGN PATENT DOCUMENTS

| | | |
|---|---|---|
| DE | 9403770 | 6/1994 |
| DE | 4338640 | 5/1995 |
| DE | 4340857 | 6/1995 |
| DE | 4407600 | 9/1995 |
| EP | 1733811 A1 | 12/2006 |
| JP | 04-354577 | 8/1992 |

OTHER PUBLICATIONS

Notice of Rejection, Japan Patent Office, Japan Application No. 2007-511479, Jul. 12, 2011.

PCT/US2010/055318 International Search Report and Written Opinion, Jul. 29, 2011.

* cited by examiner

US 8,322,640 B2

APPARATUS, SYSTEM, AND METHOD FOR COMPOSTABLE WASTE PROCESSING

CROSS-REFERENCES TO RELATED APPLICATIONS

This application claims priority to U.S. Provisional Patent Application No. 61/257,610 entitled "Apparatus, System, and Method for Compostable Waste Processing" and filed on Nov. 3, 2009 for Jody Langston, which is incorporated herein by reference.

BACKGROUND

1. Field

The subject matter herein relates to devices for processing recyclable materials and more particularly relates to appliances for processing of compostable waste products.

2. Description of the Related Art

Each American generates approximately four pounds of refuse daily. The majority of this refuse consists of solid, recyclable items that often end up in landfills, which pollute the water table and airspace. In the past thirty years, as landfills continue to fill, government agencies world-wide have taken an active role in passing legislation to require recycling. Landfills are expensive for state and local governments. Furthermore, recycling reduces the demand for virgin raw materials, meaning less strip-mining and clear-cutting, and less landfill expansion to cope with by-products of obtaining these raw materials and the associated waste.

Though recycling is a beneficial practice, the actual process of collecting recyclable materials, grinding the different types of recyclable materials, and bagging the items either for pickup or drop-off can be a troublesome ordeal. In addition, soiled refuse can become a breeding ground for vermin and bacteria, which can be unsanitary and dangerous.

Typically, households and businesses collect recyclable items and store them until the items can be delivered to a recycling center or processing facility. In general, multiple open receptacles, such as plastic containers, cardboard boxes or paper bags, are used to retain recyclable items, such as bottles, cartons, aluminum cans, cardboard, and the like.

Otherwise recyclable food packaging or paper goods may be contaminated by food residue and unsuitable for paper or plastic waste recycling. Wet food waste may be discarded into an outdoor garbage receptacle, or ground into sewage through a garbage disposer in a kitchen sink, so as to avoid the mess, objectionable odor, and health risks of storing it in the food preparation area. Disposing of food waste costs the U.S. $1 billion annually. At 48 million tons per year, it is responsible for 5.3% of the municipal solid waste in landfills.

The resulting organic waste ends up adding to the congested landfills and producing unwanted atmospheric greenhouse gasses as it decomposes, rather than being used to produce fertilizer for agriculture or natural gas for energy. Rotting food releases methane, a greenhouse gas which is twenty times more potent than carbon dioxide. By composting food waste, that methane could be harnessed to create clean energy for heat, light, and fuel.

One major problem of the actual recycling process is the cost of waste material separation. Waste management facilities cannot, or will not bear the cost of accurate material separation, for various reasons. Consumers resent the amount of labor required to clean, shred, and bag recyclable materials. Consequently, the number of landfills continues to grow, natural resources are consumed quickly, and demanding recycling efforts may yield little payback.

SUMMARY

The subject matter of the present invention has been developed in response to the present state of the art, and in particular, in response to the problems and needs in the art that have not yet been fully solved under currently available recycling technology. Accordingly, the subject matter of the present application has been developed to provide an apparatus, system, and method for processing compostable waste that overcome many or all of the above-discussed shortcomings in the art. Beneficially, such an apparatus, system, and method would provide an efficient and sanitary way to process compostable waste in preparation for composting it to create useful byproducts.

One approach would be to shred food packaging waste, used paper products, and the like, combine it with food waste and grind it together into small particles, and then package and seal it in compostable bags for convenient and sanitary handling and storage in preparation for subsequent composting.

A further approach would be to eliminate waste water used in the process, either by passively draining it off prior to bagging, or actively expelling it with a compactor. Compacting may also reduce the volume of the compostable waste for storage purposes and enable other efficiencies.

The apparatus to process compostable waste is provided with a plurality of modules configured to functionally execute the necessary steps of shredding, grinding, and bagging the compostable waste. These modules in the described embodiments include a shredding module, a grinding module, and a bagging module. The shredding module may operate to shred non-food compostable waste into shredded waste. The grinding module may operate to combine the shredded waste with food waste into combined waste, add water to the combined waste if an insufficient moisture condition exists for further processing, and grind the combined waste into particulate waste. Then the bagging module may operate to bag the particulate waste into a compostable bag.

In one embodiment, the shredding module may be further configured to include a shredder and a dry hopper that receives the non-food compostable waste and feeds it into the shredder. The grinding module may be further configured to include a grinder; a water input that supplies the water; and a wet hopper that receives the shredded waste, the food waste, and the water, and feeds the appropriately moistened combined waste into the grinder. The bagging module may be further configured to include a bagger, a bagging hopper that accumulates the particulate waste for bagging into the compostable bag, a filter that separates waste water from the particulate waste, and a drain that conducts the waste water away from the compostable bag A system is also presented to process compostable waste. The system may be embodied by the apparatus described above and a control module that controls one or more foregoing operations of the system. In particular, the system, in one embodiment, may be gravity-fed, allowing the waste water to passively drain off and the particulate waste to be dumped from the bagging hopper into the compostable bag under the force of gravity.

In another embodiment, the system may include a compactor having a ram that compresses the particulate waste to actively expel the waste water and to reduce the volume of the particulate waste. In a further embodiment, the ram may push the particulate waste into the compostable bag, and the filter may be integrated into a face of the ram in contact with the particulate waste The system is further configured, in one embodiment, to include a continuous bag roll that supplies the compostable bag to the bagger. In a further embodiment, the system may be configured to include a bag sealer that seals the compostable bag. The control module may also be responsive to various sensors, such as a sufficient moisture content sensor, a wet hopper full sensor, a bagging hopper full sensor, a bag full sensor, and the like.

A method is also presented for processing compostable waste. The method in the disclosed embodiments substantially includes the steps necessary to carry out the functions presented above with respect to the operation of the described apparatus and system. In one embodiment, the method is a machine-implemented method.

Specifically, the method may shred non-food compostable waste into shredded waste, combine the shredded waste with food waste into combined waste, add water to the combined waste if an insufficient moisture condition exists for further processing, grinding the combined waste into particulate waste, and bag the particulate waste into a compostable bag.

In an embodiment, the method may include accumulating the particulate waste in a bagging hopper for bagging into the compostable bag, separating waste water from the particulate waste through a filter, and conducting the waste water away from the compostable bag through a drain. The method also may also suspend the steps of shredding, combining, and adding water if a wet hopper full condition exists. Furthermore, the step of grinding may be suspended if a bagging hopper full condition exists.

In one embodiment, the method may include allowing the waste water to passively drain off, dumping the particulate waste from the bagging hopper into the compostable bag under the force of gravity. In an alternate embodiment, the method may include compressing the particulate waste with a compactor having a ram to actively expel the waste water and to reduce the volume of the particulate waste.

In a further embodiment, the method may include pushing the particulate waste into the compostable bag with the ram, wherein the filter is integrated into a face of the ram in contact with the particulate waste.

When the compostable bag has been filled, the handling of it may be either manual or automatic. The automatic approach may include mounting the compostable bag from a continuous bag roll, sealing the compostable bag with a bag sealer if a bag full condition exists, unmounting the sealed compostable bag, and conveying the sealed compostable bag with a bag conveyor to a storage area.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the accompanying drawings, in which.

DETAILED DESCRIPTION

Figure 1:
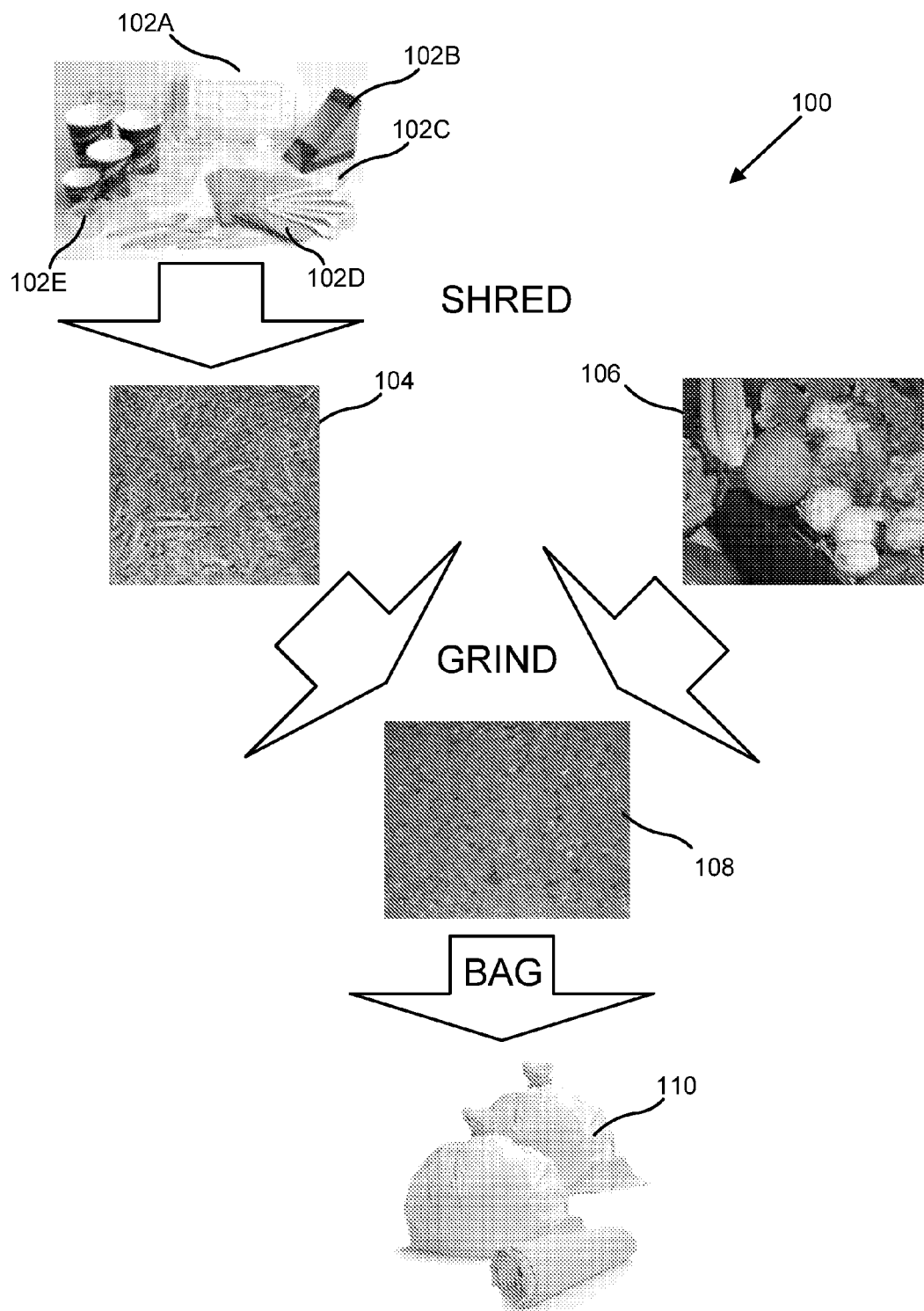
FIG. 1 is a graphical illustration of a process for recycling compostable waste products according to one representative embodiment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. A module may also be implemented with machinery.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

These features and advantages will become more fully apparent from the following description and appended claims, or may be learned by the practice of the subject matter as set forth hereinafter.

Aspects of the present invention are described below with reference to schematic flowchart diagrams and/or schematic block diagrams of methods, apparatuses, systems, and computer program products according to embodiments of the invention. It will be understood that blocks of the schematic flowchart diagrams and/or schematic block diagrams, and combinations of blocks in the schematic flowchart diagrams and/or schematic block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Reference throughout this specification to "one embodiment," "an embodiment," or similar language means that a particular feature, structure, or characteristic described in connection with the embodiment is included in at least one embodiment of the present subject matter. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the subject matter described herein. One skilled in the relevant art will recognize, however, that the subject matter described herein may be practiced without one or more of the specific details, or with other methods, components, materials, and so forth. In other instances, well-known structures, materials, or operations are not shown or described in detail to avoid obscuring aspects of the subject matter described herein.

FIG. 1 is a graphical illustration of one embodiment of a process 100 for recycling compostable waste products. The process 100 may begin with non-food compostable waste 102, such as compostable plastic packaging 102A, paper or cardboard packaging 102B, compostable plastic utensils 102C, paper napkins 102D, compostable plastic cups 102E, and other similar compostable plastic and paper products. The compostable plastic may be composed of cornstarch, polylactic acid ("PLA"), polyhydroxyalkanoate ("PHA"), and the like. Compostable plastic may also be produced from plant matter, paper mill waste, municipal waste, biodiesel waste, and so forth.

The non-food compostable waste 102 may then be shredded into shredded waste 104. The shredded waste 104 may then be combined with food waste 106 and ground into particulate waste 108. The particulate waste 108 may then be bagged into a compostable bag 110. The bags 110 may be made of compostable plastic as described above, so as to hold in any moisture present in the particulate waste 108, thus allowing the processed compostable waste to be kept in a dry, sanitary storage area until needed for composting.

Figure 2:
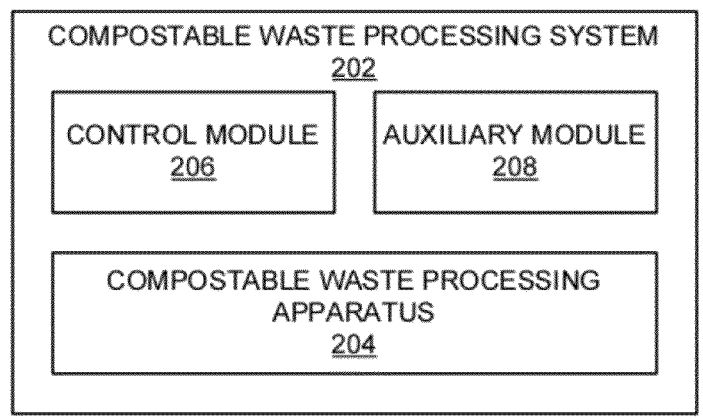
FIG. 2 is a schematic block diagram of a compostable waste processing system according to one representative embodiment.

FIG. 2 is a schematic block diagram of one embodiment of a compostable waste processing system 202, comprising a compostable waste processing apparatus 204 and a control module 206. As described below, the control module 206 may control operations of the system 202. The control mode 206 may be centralized, or may be distributed throughout the system 202 and/or the apparatus 204. In a further embodiment, an auxiliary module 208 may also be included to provide enhanced functionality.

Figure 3:
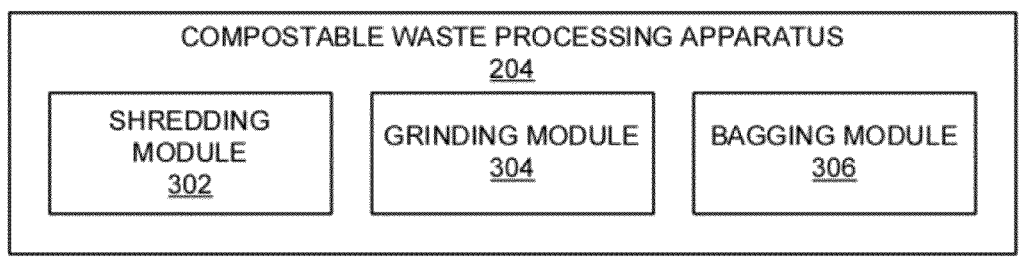
FIG. 3 is a schematic block diagram of a compostable waste processing apparatus according to one representative embodiment.

FIG. 3 is a schematic block diagram depicting one embodiment of the compostable waste processing apparatus 204. A shredding module 302 may operate to shred the non-food compostable waste 102 into the shredded waste 104. A grinding module 304 may operate to combine the shredded waste 104 with the food waste 106 into combined waste, add water to the combined waste if an insufficient moisture condition exists for further processing, and grind the combined waste into the particulate waste 108. A bagging module 306 may operate to bag the particulate waste 108 into the compostable bag 110.

Figure 4:
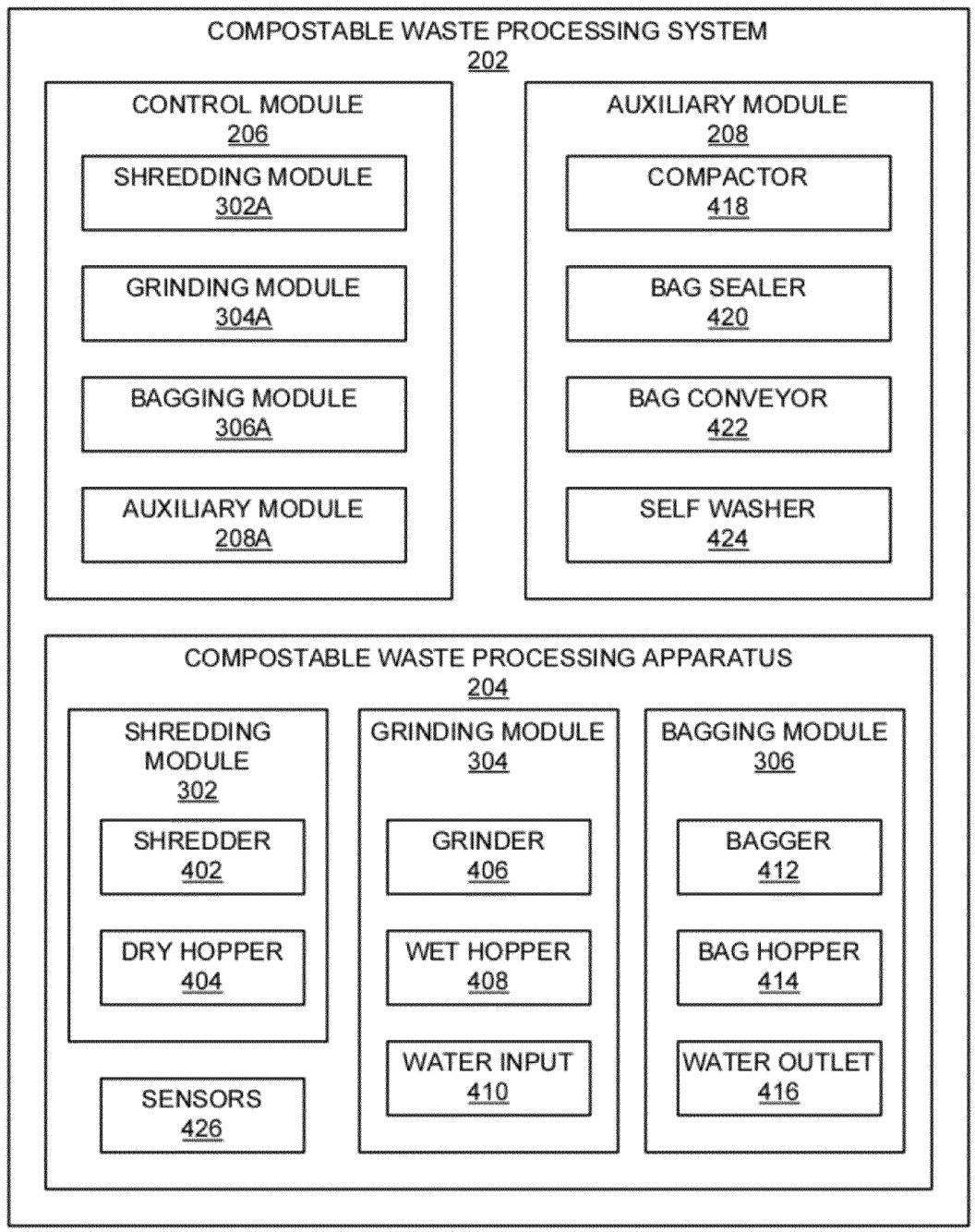
FIG. 4 is a more detailed schematic block diagram of the compostable waste processing system and apparatus according to one representative embodiment.

FIG. 4 is a more detailed schematic block diagram depicting one embodiment of the compostable waste processing system 202 and apparatus 204. The shredding module 302 may further comprise a shredder 402 and a dry hopper 404 that receives the non-food compostable waste 102 and feeds it into the shredder 402. The shredder 402 may comprise, but is not limited to, cutting rollers, a bladed drum or disk, a strip cutter, cross cutter, particle cutter, pierce-tear blades, and so forth. In a further embodiment, the shredder 402 may utilize various stages of shredding, including a coarse shredder followed by a fine shredder.

The grinding module 304 may further comprise a grinder 406, water input 410 that supplies the water, and a wet hopper 408 that receives the shredded waste 104, the food waste 106, and the water, and feeds the combined waste into the grinder 406. The grinder 406 may comprise a garbage disposer, a food mill, a disintegrator, a granulator, a hammermill, and the like. In a further embodiment, the grinder may utilize various stages of grinding, including a coarse grinder followed by a fine grinder.

The bagging module 306 may further comprise a bagger 412 and a bagging hopper 414 that accumulates the particulate waste 108 for bagging into the compostable bag 110. The bagger 412 may be a vertical bagger or a horizontal bagger. A bag sealer 420 may seal the compostable bag 110. The bagger 412 and bag sealer 420 may be an integral unit, such as form-fill-sealer ("FFS"), a flow wrapper, a side-sealer, a tube sealer, a continuous bag sealer, and the like.

If excess moisture is present in the particulate waste 108, a water outlet 416 may be provided to separate waste water from the particulate waste 108 and conduct it away from the compostable bag 110. In a further embodiment, the auxiliary module 208 may comprise a compactor 418 that compresses the particulate waste 108 to actively expel the waste water and to reduce the volume of the particulate waste 108. A conveyor 422 may unmount the sealed compostable bag 110 and convey it to a storage area. A self washer 424 may periodically wash interior components of the system 202.

Sensors 426 may also be provided, such as a sufficient moisture content sensor, a wet hopper full sensor, a bagging hopper full sensor, a bag full sensor, and so forth. The control module 206 may be responsive to the sensors 426 in controlling the operations of the system 202.

The control module 206 may comprise a shredding module 302A, a grinding module 304A, a bagging module 306A, and an auxiliary module 208A, which may or may not be distinct from the shredding module 302, the grinding module 304, the bagging module 306, and the auxiliary module 208, respectively, depending the degree to which the control functionality may be centralized or distributed. In one embodiment, the foregoing modules may be solely comprised of the corresponding control functionality.

Figure 5:
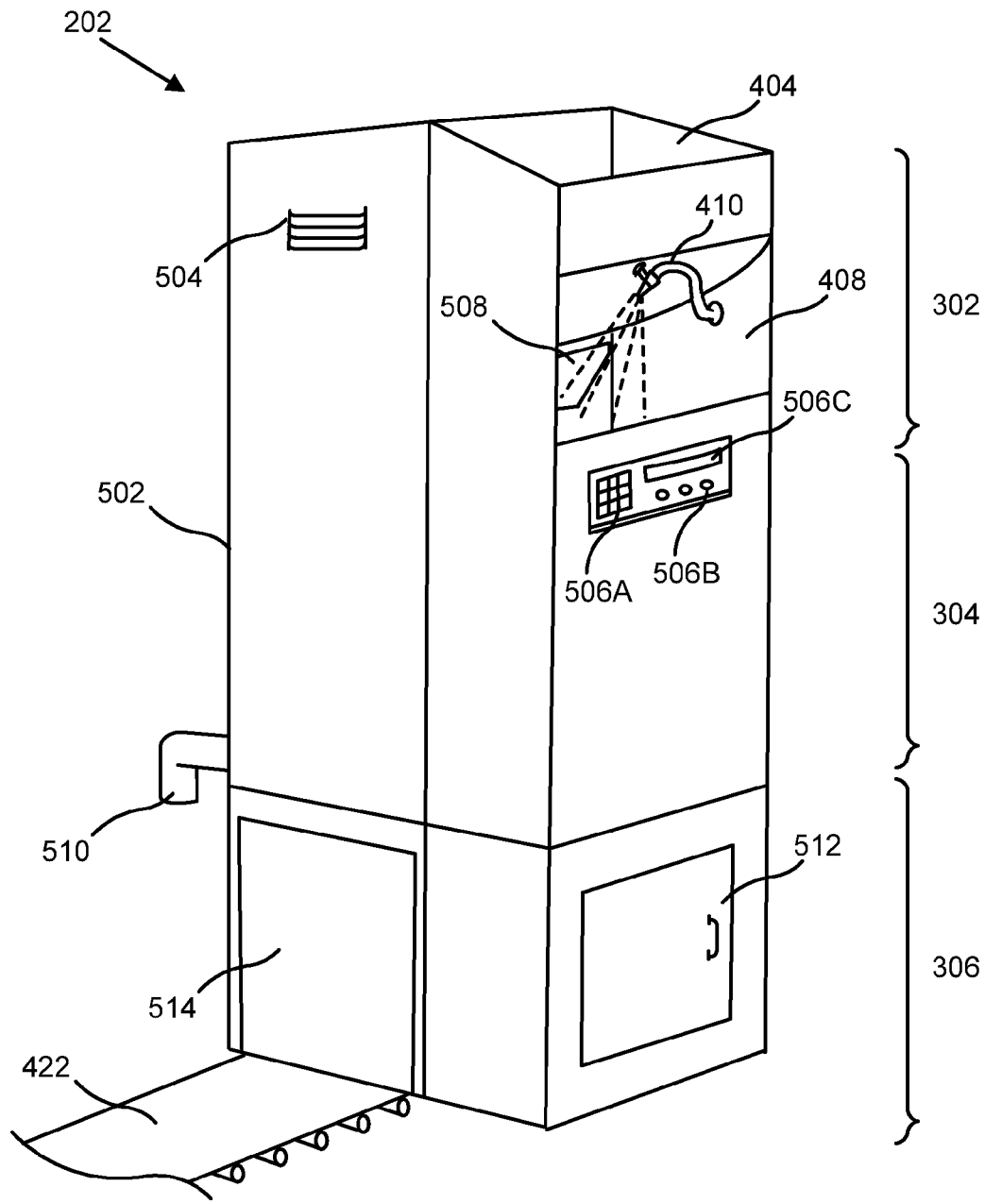
FIG. 5 is a perspective view of one embodiment of the compostable waste processing system in an enclosure.

FIG. 5 is a perspective view of one embodiment of the compostable waste processing system 202 in an enclosure 502. One or more vents 504 may be provided in the enclosure 502 to intake fresh air or exhaust heated air, so as to maintain a proper operating environment inside the closure 502.

A user interface 506 may be provided, comprising input/output devices such as a keypad 506A, buttons/knobs 506B, a display 506C, and the like. In one embodiment, the user interface 506 may comprise a computer keyboard and screen. In another embodiment, the user interface 506 may comprise a touchscreen. In a further embodiment, the user interface 506 may support remote operations through a separate control panel, a wireless connection, an internet connection, and so forth.

The modules comprising the system 202 may be arranged with the shredding module 302 on top, the grinding module 304 in the middle, and the bagging module 306 on the bottom. Non-food compostable waste 102 may be dropped into the dry hopper 404 at the top of the enclosure 502, thus reducing the risk of injury to the operator from fast-moving blades of the shredder 402 or any flying debris that may occasionally be ejected. The food waste 106 may be dumped into the wet hopper 408, further propelled by fresh water from the water input 410, and prevented from escaping by the flap 508. After grinding, waste water may be removed from the enclosure 502 through a drain 510. A bagger access panel 512 may allow the insertion of a supply of compostable bags 110. Once filled by the bagging module 306, the sealed bags 110 may be conveyed through a bag removal portal 514 by the bag conveyor 422 to a storage area.

The depicted embodiment is a single stand-alone unit. In another embodiment, the shredding module 302, the grinding module 304, and the bagging module 306 may be in separate enclosures, with ducting or other means of conveying material between them. Different numbers of the various types of modules might be linked together, depending upon the amount of waste material to be processed at each stage and the processing capacity of each module. In yet another embodiment, the compostable waste processing system 202 may be incorporated into a larger monolithic recycling unit or system which handles non-compostable recyclables as well.

Figure 6:
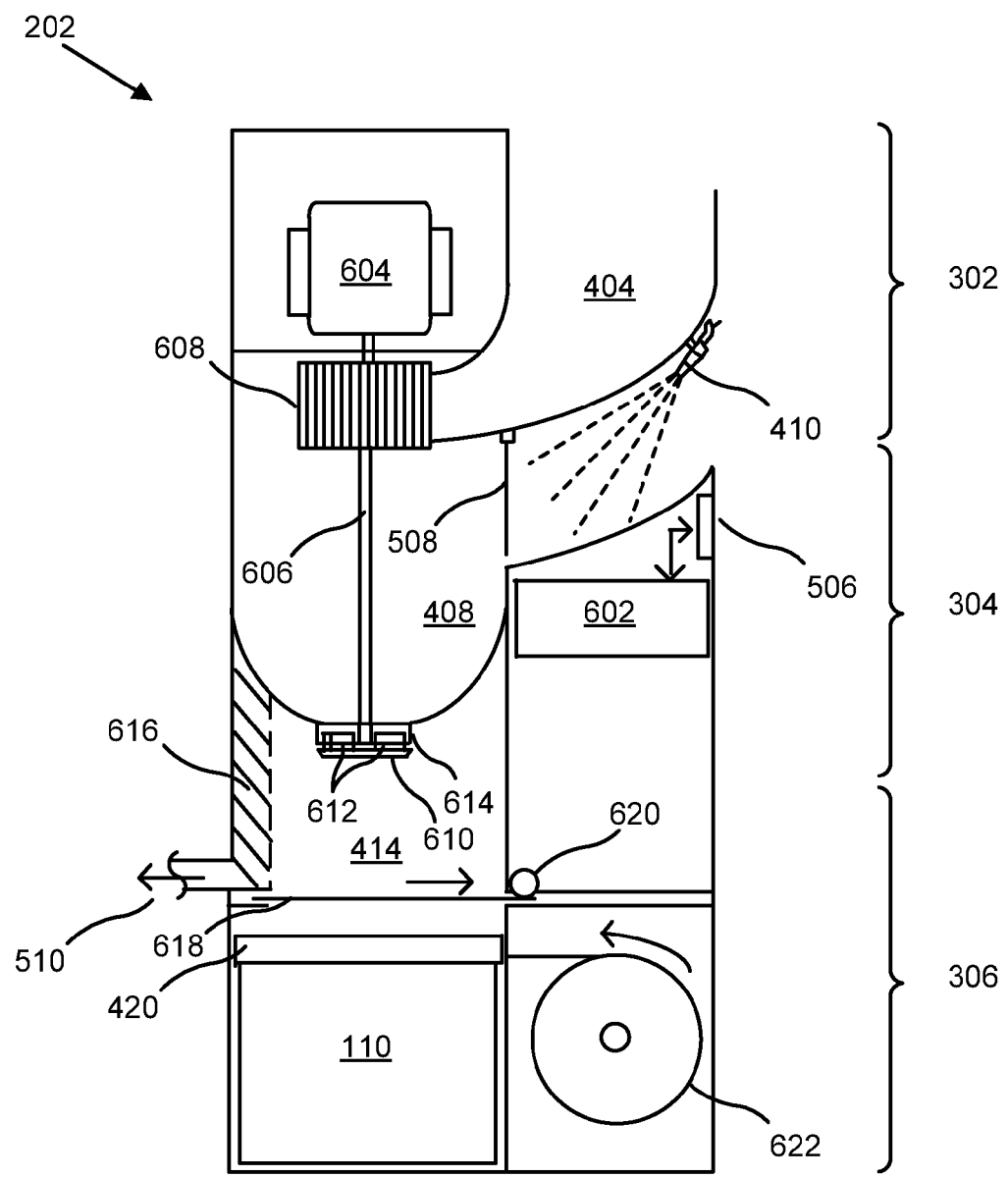
FIG. 6 is a side view of a gravity-fed embodiment of interior components of the compostable waste processing system in the enclosure.

FIG. 6 is a side view of a gravity-fed embodiment of the interior components of the compostable waste processing system 202 in the enclosure 502. A controller 602 is connected to the user interface 506. In an embodiment, the controller 602 may be a digital processor and the shredding module 302A, the grinding module 304A, the bagging module 306A, and the auxiliary module 208A may be software modules.

The depicted embodiment shows a shredder drum 608 which may comprise at least a portion of the shredder 402. Likewise, the depicted embodiment shows a grinder flywheel 610 which may comprise at least a portion of the grinder 406. In the depicted embodiment, a single motor 604 drives both the shredder 402 and the grinder 406. The motor 604 may be ventilated through the vent 504. A shaft 606 drives both the shredder drum 608 and the grinder flywheel 610. A rotational speed of 1000 to 2000 revolutions per minute ("RPM") may be appropriate for proper functioning of both the shredder 402 and the grinder 406.

Shredded waste 104, propelled by the vertical blades of the spinning shredder drum 608, falls into the wet hopper 408, where it is combined with the food waste 106 and water from the water input 410, shown here as a spray nozzle. The flap 508 may prevent the combined waste from escaping out of the wet hopper 408.

Impellers 612 attached to the grinder flywheel 610 may force the combined waste through the blades of the grinder ring 614, grinding the combined waste into the particulate waste 108 that falls into the bagging hopper 414. Any excess water may then passively drain off under the force of gravity through a filter 616 that separates the waste water from the particulate waste 108. The waste water may then flow out of the drain 510. When the excess water has thus been removed from the particulate waste 108 and the bagging hopper 414 is full, then the shredding and grinding process may be suspended and the bagging process is initiated.

A sliding door 618 in the bagging hopper 414 may be opened by a sliding door actuator 620, such as a roller, wheel, cog, or the like, allowing the particulate waste 108 to fall under the force of gravity into the compostable bag 110. The sliding door 618 forms the floor of the bagging hopper 414, thus scraping it clean as it slides into its recess, insuring that all of the particulate waste 108 falls into the bag 110. Other embodiments may also be implemented, such as a swinging trap door or doors, an iris diaphragm, and so forth. Alternatively, the bagging hopper 414 may be mounted on an axle, and pivot downward to dump its contents into the bag 110, or any other suitable dumping mechanism may be employed.

A continuous bag roll 622 may be provided, loaded through the bagger access panel 512. When the bag 110 is full, it may be sealed by the bag sealer 420, and then conveyed away through the bag removal portal 514 by the bag conveyer 422. Then a new bag 110 may be automatically mounted from the continuous bag roll 622. In another embodiment, the bag 110 may be mounted, removed, sealed, and conveyed manually, using a scissor lift to place the bag into a storage bin if it is too heavy to lift by hand.

Figure 7:
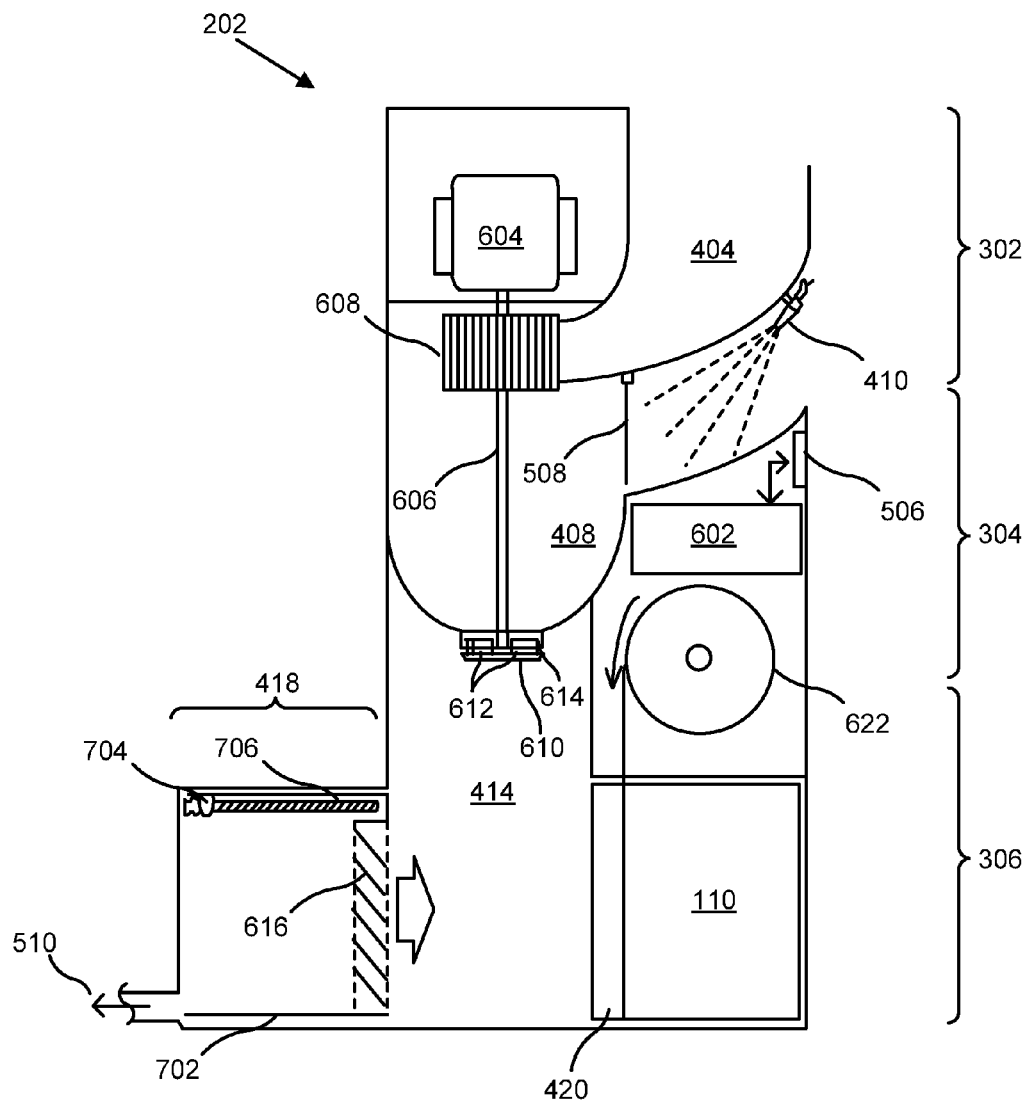
FIG. 7 is a side view of interior components of an alternate embodiment of the compostable waste processing system having a compactor.

FIG. 7 is a side view of the interior components of an alternate embodiment of the compostable waste processing system 202 having a compactor 418. The shredder module 302 and grinder module 304 may be substantially similar to those of the gravity-fed embodiment, whereas the bagging module 306 uses an active rather than passive bagging method.

The compactor 418 has a ram 702, with one or more ram nuts 704 affixed to the inside wall of the ram 702, each of which is driven by a ram screw 706. A motor and ram screw drive train (not shown) may be mounted inside of the compactor 418 to move the ram 702 into and out of the bagging hopper 414. The compostable bag 110 may be side-mounted in this embodiment, so that the ram 702 may push the particulate waste 108 into the bag 110, as opposed to relying on the force of gravity. If desired, the compactor 418 may be used to further compress the particulate waste 108 into the bag 110 so that it can hold more material.

The compactor 418 may also hasten the removal of any waste water, as opposed to allowing it to passively drain away under the force of gravity. The filter 616 may be mounted in a face of the ram 702 that is in contact with the particulate waste 108 during compression, thereby receiving the waste water as it is thus expelled. The expelled waste water may then flow through the hollow cavity behind the ram 702 and down the drain 510, which has been placed at the bottom of the compactor 418 in this embodiment.

It may be noted that pushing the ram 702 into the bagging hopper 414 may have a similar effect as closing the sliding door 618. Thus, the bag 110 is separated from the bag hopper 414, thereby allowing the bag sealer 420 to seal the bag 110 and the bag conveyer 422 to remove it through the bag removal portal 514. Furthermore, the processes of shredding and grinding may continue as long or as often as with the gravity-fed process, since particulate waste 108 can continue to accumulate as the ram 702 is being pushed into the bagging hopper 414, as long as the bagging hopper 414 is not full.

A self-washer 424 may also be provided, comprising one or more water inputs 410, including that shown in the figure and others not shown, strategically placed inside the enclosure 502. In one embodiment, the system 202 may go through a self-washing cycle in which no waste material is deposited into the dry hopper 404 or the wet hopper 408 and any waste material still in the system 202 is flushed out, bagged, and the system 202 is thoroughly rinsed by the water inputs 410. In a further embodiment, the filter 616 may be back-flushed with a water input 410 dedicated to that purpose, thus reducing the frequency with which cleaning, maintenance, or replacement of the filter 616 may be required.

Figure 8:
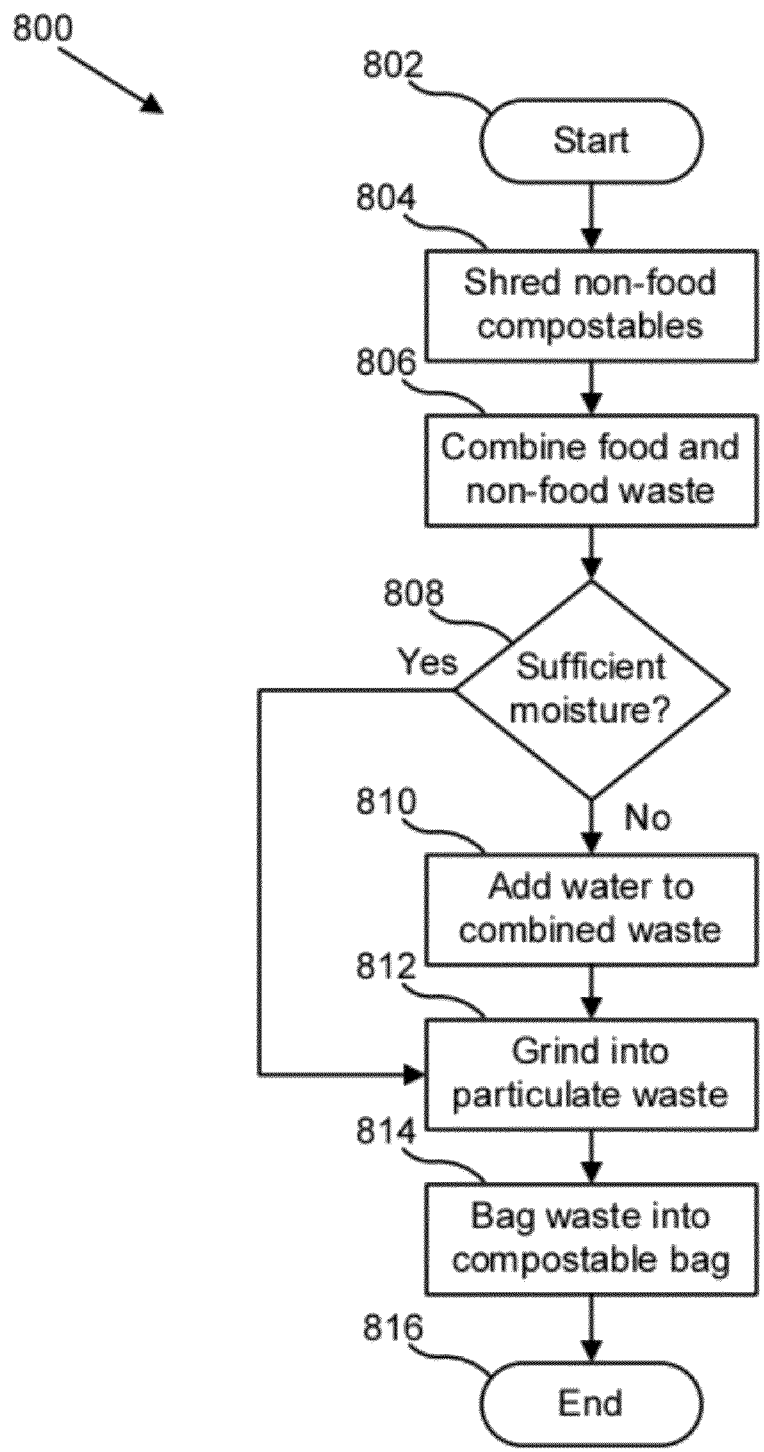
FIG. 8 is a schematic flow chart diagram illustrating one embodiment of a compostable waste processing method.

FIG. 8 is a schematic flow chart diagram illustrating one embodiment of a compostable waste processing method 800. The method 800 begins 802 and the shredding module 302 shreds 804 non-food compostable waste 102 into shredded waste 104. The grinding module 304 combines 806 the shredded waste 104 with the food waste 106 into combined waste. If an insufficient moisture condition 808 exists for further processing, then water is added 810 to the combined waste. The grinding module 304 then grinds 812 the combined waste into particulate waste 108. The bagging module 306 then bags 814 the particulate waste 108 into a compostable bag 110, and the method 800 ends 816.

Figure 9:
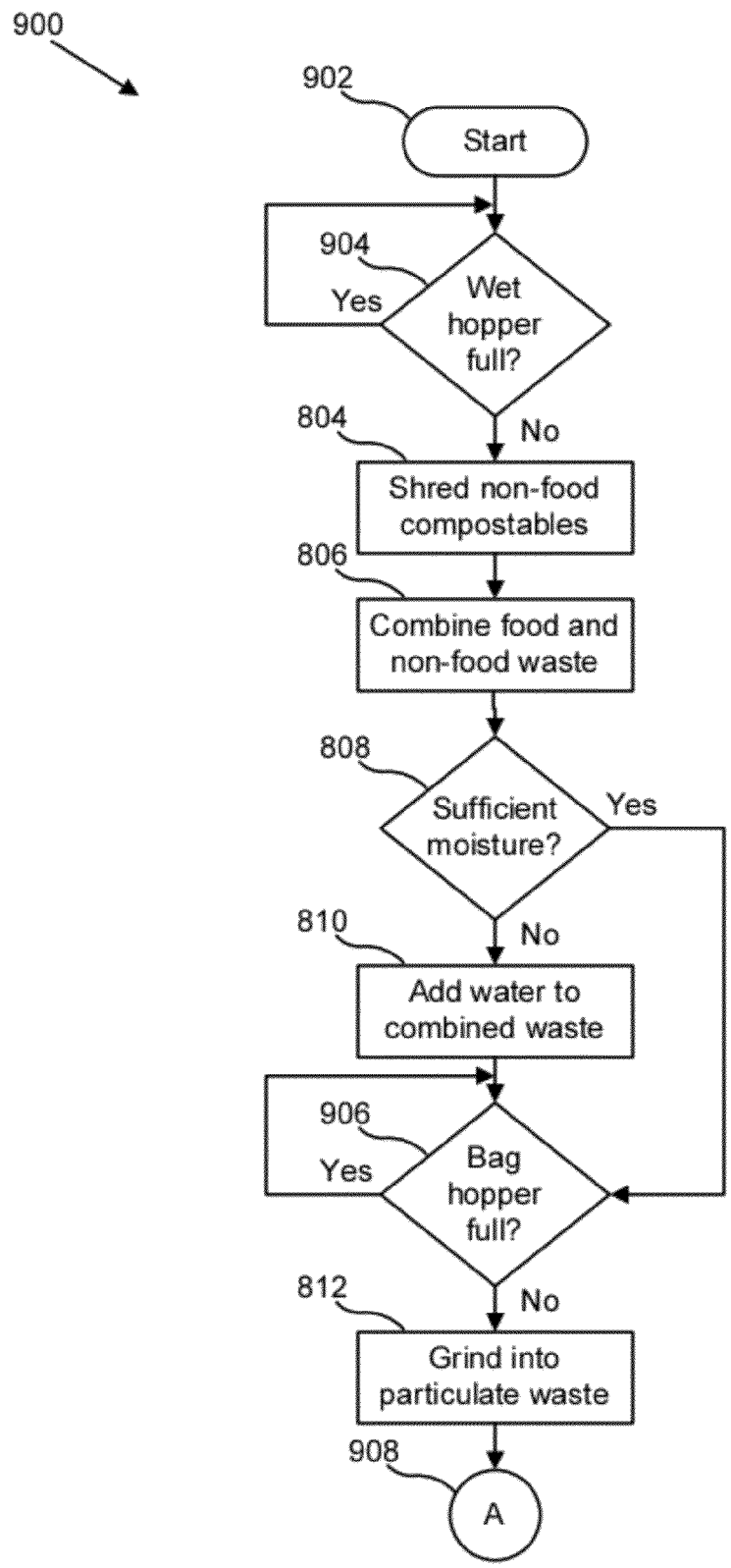
FIG. 9 is a more detailed schematic flow chart diagram illustrating one embodiment of method for shredding and grinding, comprising an initial portion of the compostable waste processing method.

FIG. 9 is a detailed schematic flow chart diagram illustrating one embodiment of method 900 for shredding and grinding, comprising an initial portion of the compostable waste processing method 800. The method 900 begins 902, and if a wet hopper full condition 904 exists, then the method 900 is suspended at that point. Otherwise, the method 900 continues and the shredding module 302 shreds 804 non-food compostable waste 102 into shredded waste 104. The grinding module 304 combines 806 the shredded waste 104 with the food waste 106 into combined waste. If an insufficient moisture condition 808 exists for further processing, then water is added 810 to the combined waste.

If a bagging hopper full condition 906 exists, then the method 900 is suspended at that point. Otherwise, the grinding module 304 grinds 812 the combined waste into particulate waste 108, and the method 900 ends 908 at point A.

Figure 10:
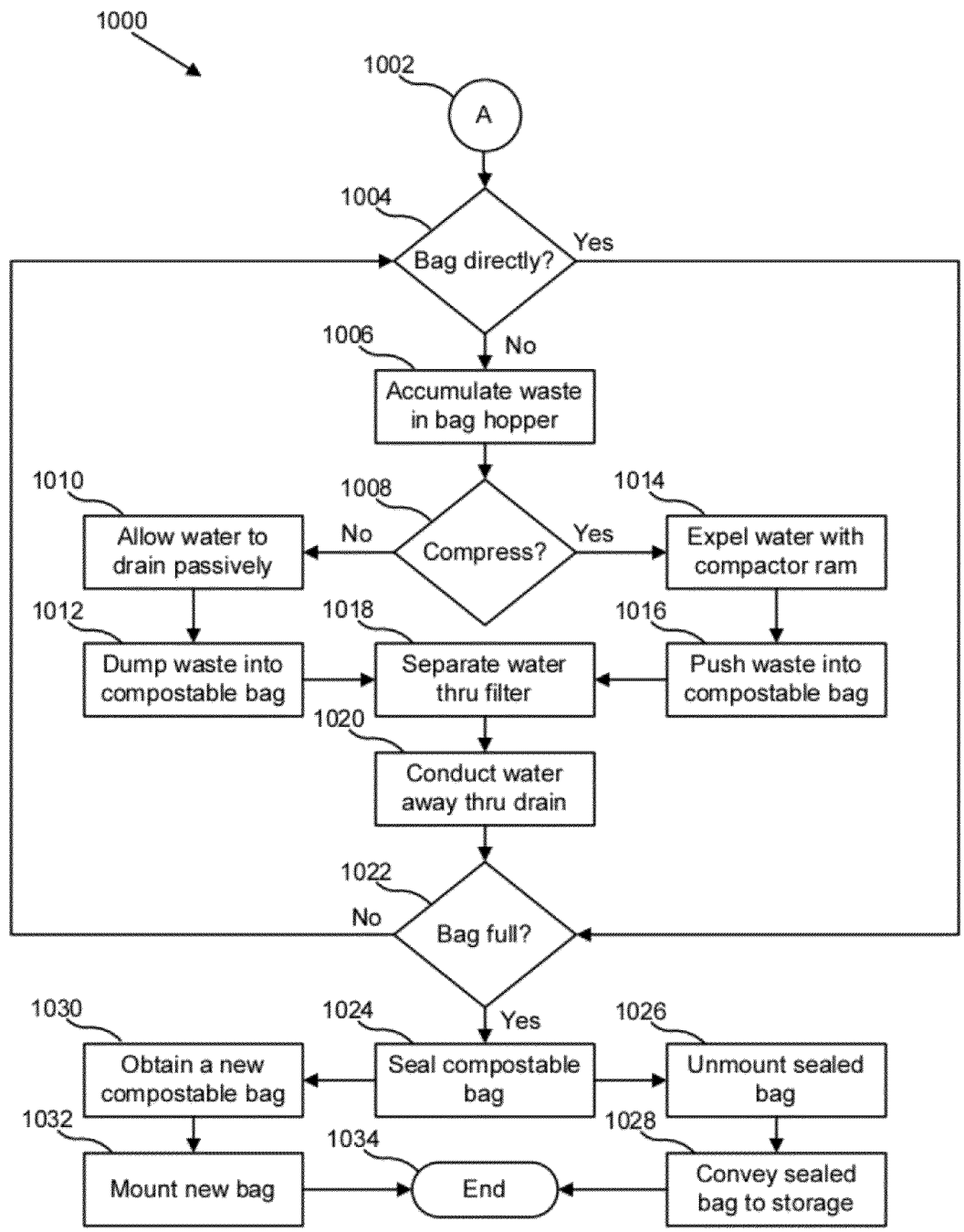
FIG. 10 is a more detailed schematic flow chart diagram illustrating one embodiment of method for bagging, comprising a latter portion of the compostable waste processing method.

FIG. 10 is a more detailed schematic flow chart diagram illustrating one embodiment of method 1000 for bagging, comprising a latter portion of the compostable waste processing method 800. The method 1000 begins 1002 at point A, where method 900 left off. If it is possible to bag the particulate waste 108 directly 1004, without removing any waste water, then the process of filling the bag 110 continues as long as a bag full condition 1022 does not exist. In this case, the bag 110 and the bagging hopper 414 are effectively one and the same. If so, it should also be noted that the bagger hopper full condition 906 would likewise be the same as the bag full condition 1022, for purposes of both the method 900 and the method 1000 respectively.

Otherwise, the particulate waste 108 is accumulated 1006 into the separate bagging hopper 414. If the particulate waste 108 is not be compressed 1008, then the waste water is allowed 1010 to passively drain off, and dumped 1012 from the bagging hopper 414 into the compostable bag 110 under the force of gravity. If the particulate waste 108 is to be compressed 1008, then the compactor 418 actively expels 1014 the waste water with the ram 702, reducing the volume of the particulate waste 108, which is then pushed 1016 into the compostable bag 110.

The bagging module 306 then separates 1018 the waste water from the particulate waste 108 through the filter 616, and conducts 1020 the waste water away from the compostable bag 110 through the drain 510. If the bag full condition 1022 does not exist, then the method 1000 repeats from the beginning, accumulating 1006 the particulate waste 108 into the bagging hopper 414.

If the bag full condition 1022 does exist, then the bag sealer 420 seals 1024 the compostable bag 110. The sealed compostable bag 110 is then unmounted 1026 and the bag conveyor 422 conveys 1028 the sealed compostable bag 110 to a storage area. A new compostable bag 110 is obtained 1030 from the continuous bag roll 622. The new bag 110 is mounted 1032 and the method 1000 ends 1034.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a shredding module that operates to shred non-food compostable waste into shredded waste;
   a grinding module that operates to
      combine the shredded waste with food waste into combined waste,
      add water to the combined waste if an insufficient moisture condition exists for further processing, and
      grind the combined waste into particulate waste; and
   a bagging module that operates to bag the particulate waste into a compostable bag.

2. The apparatus of claim 1, wherein the shredding module further comprises:
   a shredder; and
   a dry hopper that receives the non-food compostable waste and feeds it into the shredder.

3. The apparatus of claim 1, wherein the grinding module further comprises:
   a grinder;
   a water input that supplies the water; and
   a wet hopper that receives the shredded waste, the food waste, and the water and feeds the combined waste into the grinder.

4. The apparatus of claim 1, wherein the bagging module further comprises:
   a bagger;
   a bagging hopper that accumulates the particulate waste for bagging into the compostable bag;
   a filter that separates waste water from the particulate waste; and
   a drain that conducts the waste water away from the compostable bag.

5. A system comprising:
   a shredder that shreds non-food compostable waste into shredded waste;
   a dry hopper that receives the non-food compostable waste and feeds it into the shredder;
   a grinder that
      combines the shredded waste with food waste into combined waste,
      adds water to the combined waste if an insufficient moisture condition exists for further processing, and
      grinds the combined waste into particulate waste;
   a water input that supplies the water;
   a wet hopper that receives the shredded waste, the food waste, and the water and feeds the combined waste into the grinder;
   a bagger that bags the particulate waste into a compostable bag;
   a bagging hopper that accumulates the particulate waste for bagging into the compostable bag;
   a filter that separates waste water from the particulate waste;
   a drain that conducts the waste water away from the compostable bag; and
   a control module that controls one or more foregoing operations of the system.

6. The system of claim 5, wherein the waste water is allowed to passively drain off and the particulate waste is dumped from the bagging hopper into the compostable bag under the force of gravity.

7. The system of claim 5, further comprising a compactor having a ram that compresses the particulate waste to actively expel the waste water and to reduce the volume of the particulate waste.

8. The system of claim 7, wherein the ram pushes the particulate waste into the compostable bag, and the filter is integrated into a face of the ram in contact with the particulate waste.

9. The system of claim 5, further comprising a continuous bag roll that supplies the compostable bag to the bagger.

10. The system of claim 5, wherein the bagger further comprises a bag sealer that seals the compostable bag.

11. The system of claim 5, further comprising one or more of a sufficient moisture content sensor, a wet hopper full sensor, a bagging hopper full sensor, and a bag full sensor, to which the control module is responsive in controlling the operations of the system.

12. A machine-implemented method comprising:
   shredding non-food compostable waste into shredded waste;
   combining the shredded waste with food waste into combined waste;
   adding water to the combined waste if an insufficient moisture condition exists for further processing;
   grinding the combined waste into particulate waste; and
   bagging the particulate waste into a compostable bag.

13. The method of claim 12, wherein bagging the particular waste further comprises:
   accumulating the particulate waste into a bagging hopper for bagging into the compostable bag;
   separating waste water from the particulate waste through a filter; and
   conducting the waste water away from the compostable bag through a drain.

14. The method of claim 13, further comprising:
   allowing the waste water to passively drain off; and
   dumping the particulate waste from the bagging hopper into the compostable bag under the force of gravity.

15. The method of claim 13, further compressing the particulate waste with a compactor having a ram to actively expel the waste water and to reduce the volume of the particulate waste.

16. The method of claim 15, further comprising pushing the particulate waste into the compostable bag with the ram, wherein the filter is integrated into a face of the ram in contact with the particulate waste.

17. The method of claim 12, wherein shredding non-food compostable waste, combining the shredded waste with food waste, and adding water to the combined waste, are suspended if a wet hopper full condition exists.

18. The method of claim 12, wherein grinding the combined waste into particulate waste is suspended if a bagging hopper full condition exists.

19. The method of claim 12, wherein bagging the particulate waste into the compostable bag further comprises:
   mounting the compostable bag from a continuous bag roll; and
   sealing the compostable bag if a bag full condition exists.

20. The method of claim 19, further comprising:
   unmounting the sealed compostable bag; and
   conveying the sealed compostable bag to a storage area.

\* \* \* \* \*